Sept. 22, 1942.  V. K. ZWORYKIN  2,296,695
POWER TRANSMITTING MECHANISM
Filed Aug. 3, 1940  3 Sheets-Sheet 2

VLADIMIR K. ZWORYKIN Inventor

By C. D. Tuska

Attorney

Sept. 22, 1942.   V. K. ZWORYKIN   2,296,695
POWER TRANSMITTING MECHANISM
Filed Aug. 3, 1940   3 Sheets-Sheet 3

VLADIMIR K. ZWORYKIN Inventor

By C D Tuska

Attorney

Patented Sept. 22, 1942

2,296,695

UNITED STATES PATENT OFFICE 2,296,695

POWER TRANSMITTING MECHANISM

Vladimir K. Zworykin, Marlton, N. J.

Application August 3, 1940, Serial No. 350,787

9 Claims. (Cl. 60—12)

This invention relates to power transmitting mechanisms and especially to a mechanism in which movable pistons are coupled by a fluid. The fluid is retained, at least partly, within a rotor which includes passageways so constructed and arranged that movement of the fluid produces rotation of the rotor.

It is old to employ a fluid to transmit power; in general fluid transmissions couple a motor and a shaft to be rotated. It is also old to use a fluid to couple pistons which form part of a compressor. In such a compressor the compressed gas may be used to drive a turbine from which rotational power is obtained. In other devices the motor, including the fluid coupled pistons, is provided with mechanical means to convert the forces generated by the piston movements into rotational forces.

It is one of the objects of the present invention to provide means for coupling pistons with a fluid which passes through a channel in a rotational member so arranged that the passage of the fluid produces rotation of the member. Another object is to provide means in a fluid transmission system whereby the pistons may be coupled by the fluid and whereby the power strokes of the piston produce rotational forces without the usual crankshaft and connecting rods.

Figure 1:
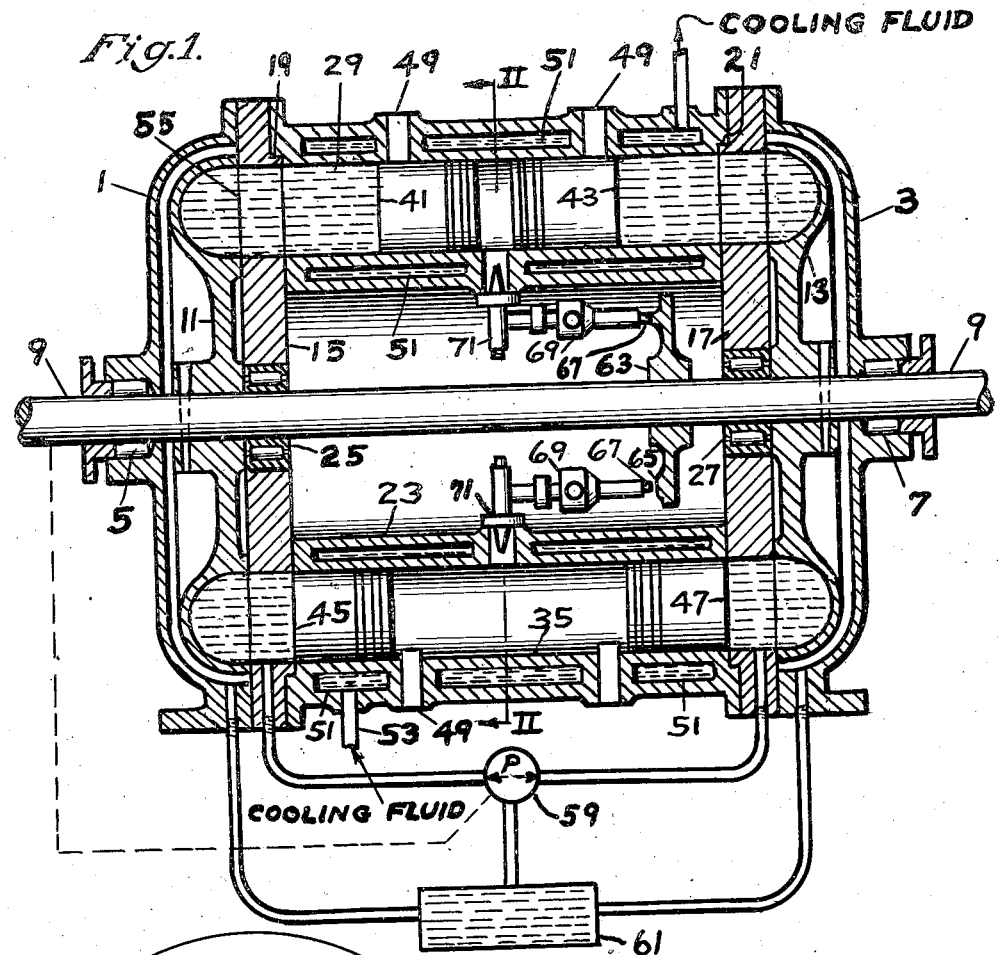
Figure 2:
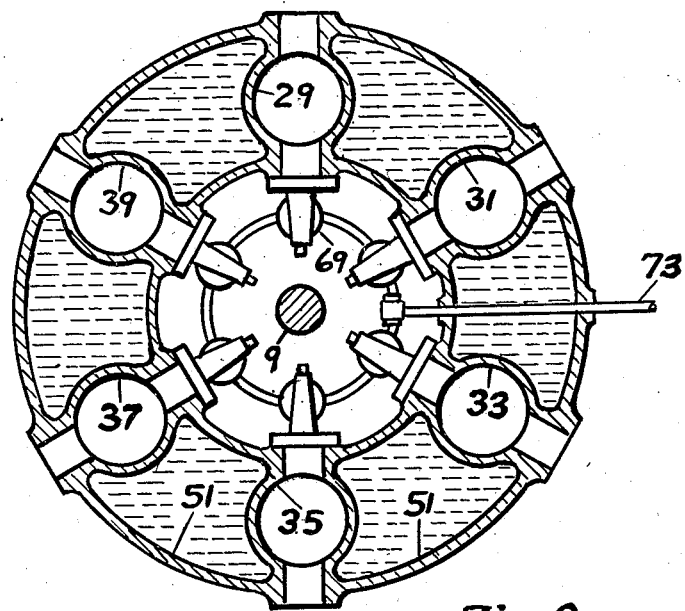
Figure 3:
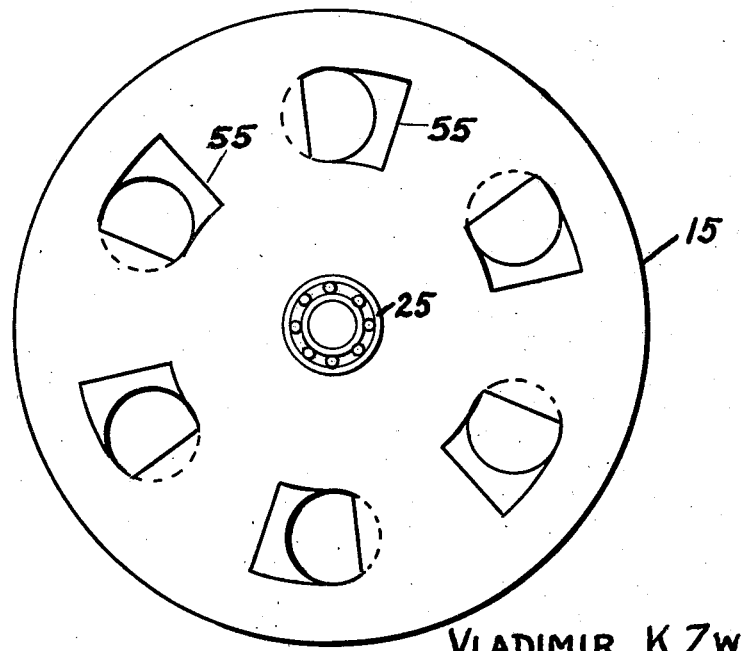
Figure 5:
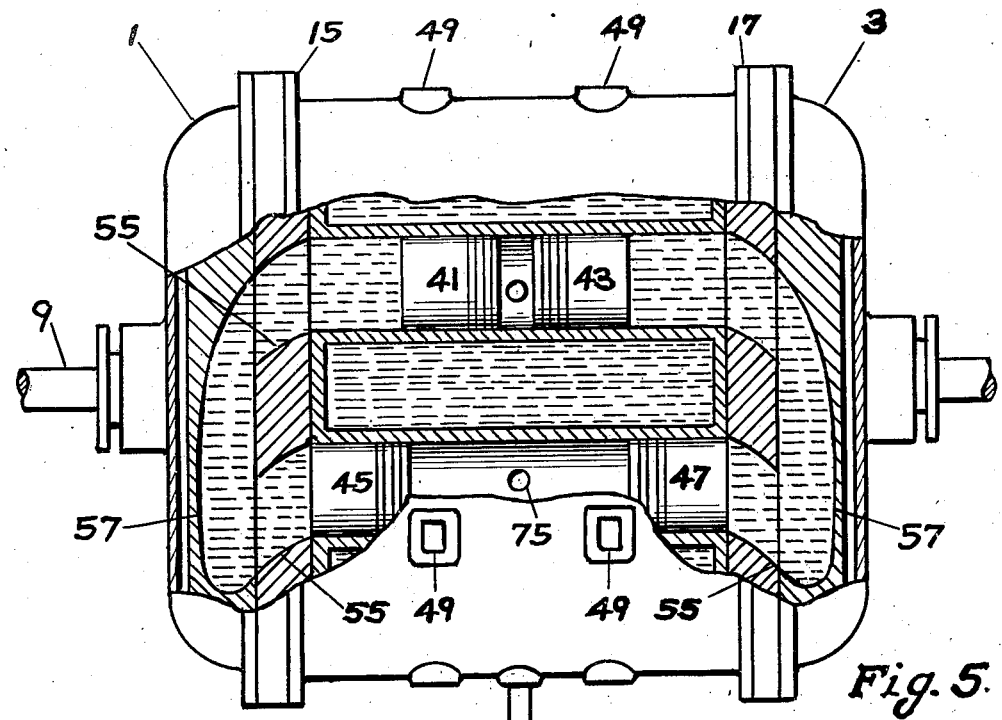
Figure 6:
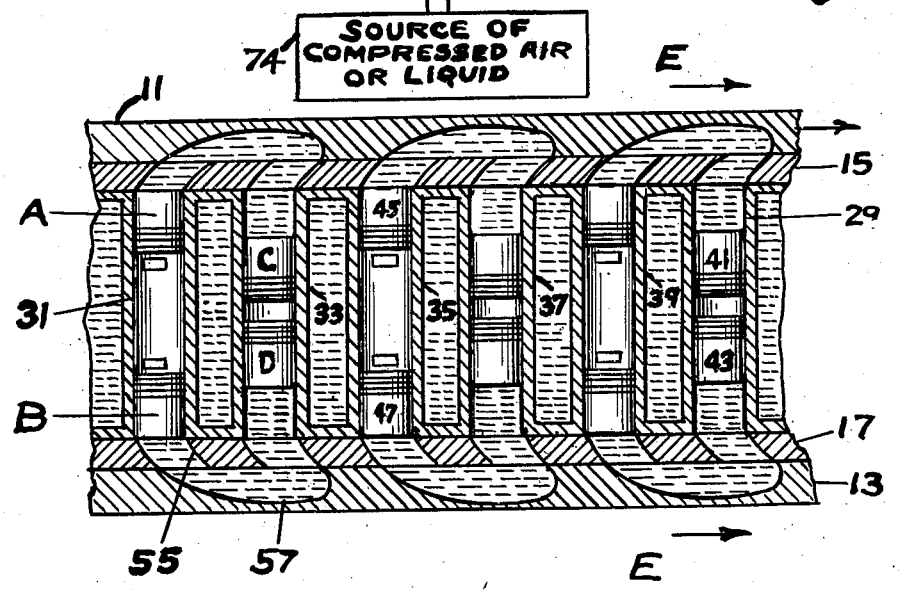

The invention will be described by referring to the accompanying drawings in which Fig. 1 is a view, mainly in section, of one embodiment of the invention; Fig. 2 is a sectional view taken along the line II—II; Fig. 3 is an elevational view of an end plate of the cylinder barrel; Fig. 4 is an end view of a portion of the transmission system; Fig. 5 is an elevational view, partly in section, of a modification of the invention; and Fig. 6 is an expanded view of the cylinders and rotor of the invention. In describing the invention similar reference characters will be applied to similar elements.

Referring to Fig. 1, a pair of end plates 1, 3, are provided with bearings 5, 7, within which is arranged a shaft 9. Rotors 11, 13, are secured to the shaft and are arranged within the end plates. Inner end plates 15, 17, are positioned adjacent the rotors 11, 13, respectively and are provided with shoulder portions 19, 21, which support a cylinder barrel 23. The inner end plates may be provided with bearings 25, 27, which offer additional support for the shaft.

The cylinder barrel includes six cylinders 29, 31, 33, 35, 37, 39; although the invention is not to be limited to any particular number of cylinders. Pairs of opposed pistons 41, 43 and 45, 47, are fitted into the respective cylinders. Exhaust ports 49 are included in each of the cylinders which are preferably water-jacketed as shown at 51 and connected to a fluid cooling system as indicated at 53. It should be understood that air cooling may be used.

The inner end plates include apertures 55 which are substantially aligned with the cylinders. The rotors 11, 13, are each provided with three channels 57. These channels are arranged so that each channel connects the ends of the adjacent cylinders during the successive cycles of operation as will be explained hereinafter. The channels are filled with a fluid, which is preferably a lubricant. The fluid fills the entire space between the ends of the adjacent cylinders, the apertures in the inner end plates, and the channels in the rotors. The thus described fluid may be replenished by means of a pump 59 which is connected to the apertures 55 and to a reservoir 61. The reservoir also serves to collect that portion of the fluid which leaks around the rotor. Any suitable means may be inserted between the rotors and the inner end plates to keep the fluid leakage to a minimum. Some of the leakage lubricant is preferably used to keep the bearings, cylinders, and bearing surfaces lubricated. The pump 59 may be driven from the motor shaft 9 when replenishment is necessary.

A cam member 63 is secured to the motor shaft. The cam member is provided with a plurality of cam surfaces 65. These surfaces engage the shafts 67 of valve members 69, 71 which control the injection of compressed air into the cylinder through the ports 75. The valves are connected to a source 74 of compressed air by means of a pipe 73 as shown in Figs. 2 and 5.

The operation of the device will be explained by reference to Fig. 6: It is assumed that compressed air has been injected between the heads of the pistons A and B of cylinder 31 and that these pistons have been driven apart by the power stroke. The power thus expended drives the fluid connecting the piston A with the next piston C, and the fluid connecting the piston B with the next piston D, through the apertures 55 and the channels 57 in the rotors. The movement of the fluid forces the pistons C and D together and thus compresses the air between them which has not escaped through the ports 49. Just before the pistons come together, the compressed air is injected into the cylinder 33. The pistons C and D are then driven apart, and the cycle repeats.

The described cycle takes place not only in cylinders 31 and 33, but also in the other pairs of cylinders 35—37 and 39—29 simultaneously. While the described operations are taking place another operation occurs: The fluid channels 57 are within the rotors 11 and 13 which are free to rotate. Since the channels are shaped to provide a component of the force in the direction of the arrow E, it follows that the rotors will move in the direction of the arrows. Thus the channel which connected cylinders 31 and 33 for the power portion of the stroke in cylinder 31, will next connect the cylinders 33 and 35 for the power stroke in cylinder 33, etc.

The channels are designed so that they will connect the adjacent cylinders during that part of the cycle which includes the power and compression stroke. Inasmuch as the adjacent cylinders are connected by the fluid during most of the power stroke, it follows that the power loss when the rotor movement is shifting the channels to the next pair of cylinders is comparatively slight. While theoretically there should be no loss of coupling fluid during the transfer of the channels from one cylinder to the next, practically some loss will occur. The operator may inject additional fluid into the system when the device is in motion or by recharging the system when the device is at rest.

Thus the invention has been described as a fluid transmission system in which pairs of reciprocating pistons are coupled to other pairs of reciprocating pistons by means of a fluid coupling. The fluid coupling column passes through a channel in a rotor which is fastened to the shaft to be driven. The channel is formed to produce a component of force from the fluid movement in the direction which causes the rotor to rotate.

What is claimed is:

1. A fluid transmission system including in combination a cylinder barrel including a plurality of cylinders, pairs of pistons arranged respectively within said cylinders, and a pair of rotors positioned respectively adjacent the ends of said cylinder barrel, said rotors including channels arranged to couple the ends of adjacent cylinders and to include a coupling fluid, said channels being so shaped that movement of the coupling fluid produces a rotary movement of said rotor.

2. A fluid transmission system including in combination a member including a plurality of cylinders, pairs of pistons, each of said pairs of pistons being arranged within one of said cylinders for reciprocating movement therein, inner end members fastened to the respective ends of said cylinder member and including apertures arranged in substantial alignment with each of said cylinders, and a pair of rotors mounted for rotation adjacent each of said end members, said rotors including channels for connecting the adjacent cylinders with a fluid coupling the pistons of adjacent cylinders and being so formed that movements of said fluid produce rotation of said rotor.

3. A fluid transmission system including a plurality of cylinders, a plurality of pistons, two pistons of said plurality being arranged within each of said cylinders for reciprocating movement therein, a shaft, rotors arranged opposite the ends of said cylinders and supported for rotation on said shaft, said rotors including channels for coupling the adjacent cylinders and arranged for conducting a fluid coupling the pistons of said adjacent pair of cylinders, and means for applying power to drive said pistons so that said fluid is driven through said channels to rotate said rotor.

4. A system of the character of claim 3 including a cam member driven by said shaft for synchronizing the application of power with the position of said rotor.

5. A transmission system including a plurality of cylinders, pairs of pistons arranged within each of said cylinders for movements therein adapted to produce compression and expansion strokes, said cylinders being spaced parallel to a common axis, a shaft located on said axis, a pair of rotors secured to said shaft and arranged for rotation in a plane parallel to the ends of said cylinders, said rotors including channels coupling pairs of said cylinders so that compression in one corresponds to expansion in the other, and a fluid arranged between said cylinders and within said channel to couple the respective pistons of the coupled cylinders.

6. A system of the character of claim 5 including a cam member driven by said shaft, means for applying power to said cylinders, and means coupling said cam member and said power applying means so that said power is applied when said rotors are in the optimum position to absorb power.

7. A fluid transmission system including in combination a plurality of cylinders having their axes parallel to a common axis, pairs of pistons arranged within each of said cylinders for movements therein adapted to produce compression and expansion strokes, a pair of inner end plates located at the ends of said cylinders and having apertures in substantial alignment with said cylinders, a shaft having its axis at said common axis and passing through said inner end plates, a pair of rotors attached to said shaft and arranged for rotation against the outer surfaces of said inner end plates, a second pair of end plates surrounding said rotors and connected respectively to form a fluid tight connection around said rotors, and bearings within said second pair of end plates for said shaft, said rotors including channels so formed and arranged that they couple the pistons of the cylinder including an expansion stroke with the cylinder including a compression stroke, when the space and channel therebetween is filled with a fluid.

8. A system of the character of claim 7 including means coupled to said shaft to supply power to said cylinders in synchronism with the movement of the rotors.

9. A system of the character of claim 7 including means for applying gases under pressure to said cylinders to produce said expansion stroke in one cylinder so that said fluid coupling produces said compression stroke in the other cylinder.

VLADIMIR K. ZWORYKIN.